B. F. Woodside

73275

Friction Matches

PATENT
JAN 14 18

Witnesses,
A. M. Stout Jr.
Saml J. Frazier

Benjamin F. Woodside
By Daniel Breed

United States Patent Office.

BENJAMIN F. WOODSIDE, OF McDONALD, TENNESSEE.

Letters Patent No. 73,275, dated January 14, 1868.

---

IMPROVEMENT IN FRICTION-MATCHES.

---

The Schedule referred to in these Letters Patent and making part of the same.

---

TO ALL WHOM IT MAY CONCERN:

Be it known that I, BENJAMIN F. WOODSIDE, of McDonald, in the county of Bradley, and State of Tennessee, have invented a new and useful Improvement in Friction-Matches; and I do hereby declare that the following is a full and exact description thereof, reference being had to the accompanying drawings, and to the letters of reference marked thereon. In the accompanying drawings—

Figures 1, 2:
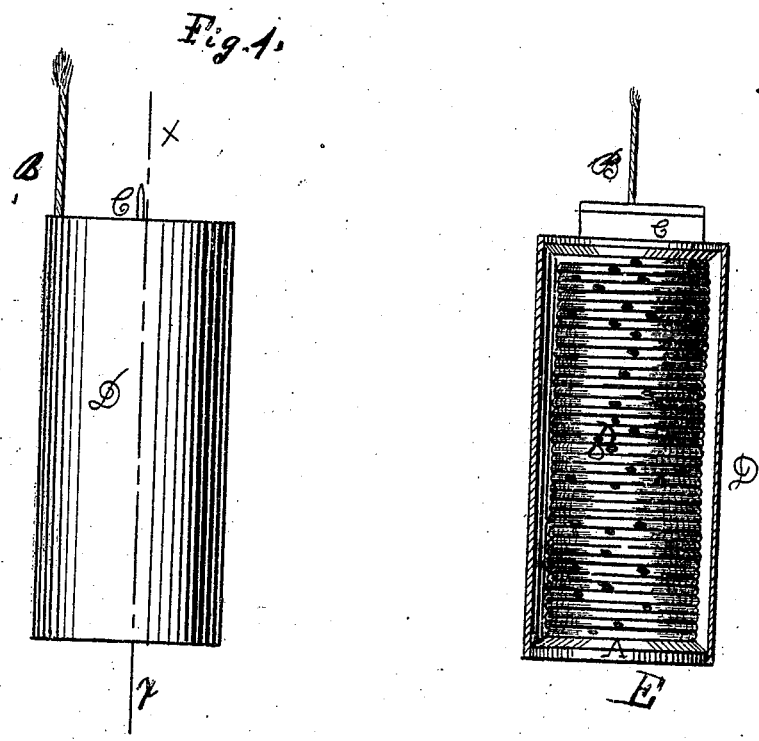
Figure 1 is a side view of my improved match wound upon a spool and covered by a case.
Figure 2 shows the twine wound upon the spool, the case being cut away in front, such section being made upon line $x\ x$, fig. 1.

My invention consists of a twine or cord coated at intervals with an igniting composition, and wound in convenient form for carrying in the pocket to be used as a box of matches.

In the construction of my invention a spool, A, of suitable size, may be taken, and the prepared twine or cord B wound thereon, as shown in fig. 2. The spool may be provided with a case, D, as seen in fig. 1, for protecting the matches from the weather, and from the friction or wear of the pocket. Also, a knife may be inserted into the end of the spool, as seen at C, figs. 1 and 2, for the purpose of cutting the cord or twine. A notch is made in the head of the spool to allow the cord or twine to project and be used as a taper, the spool itself forming the stand or candlestick. The twine or cord may be coated with any ordinary igniting composition used in making matches, such composition being put upon the cord at suitable intervals, say about three inches, more or less, as is found most convenient and economical. The twine may also be waxed so as to be used as a taper, as shown in fig. 1. One end of the spool may be provided with sand-paper, E, for igniting the match. And the knife may be put upon inside of the head of the spool, so as to be concealed when the box or case is closed or slipped home on the spool.

This continuous match or coated twine may be wound into a ball or otherwise packed, but I prefer the spool. Either paper, twine, or any other suitable material may be used for coating as a match.

When a match is wanted, the twine is drawn from the spool, and one length or a single match cut off by drawing the twine across the knife. Then this single match is ignited in the usual way. If a light is wanted for a longer time than a single match will burn, then the end of the continuous match or main twine is lighted, as seen in fig. 1.

I am aware that a series of flexible matches has been made in the form of a tape, therefore I do not claim such invention.

Having thus fully described my invention, what I claim, and desire to secure by Letters Patent of the United States, is—

1. A twine or cord, coated at intervals with igniting composition as a series of friction-matches, substantially as above described.

2. I also claim such twine, in combination with a spool, or wound into a ball, substantially as specified.

3. I claim the case D, in combination with the continuous match, substantially as specified.

4. I claim a twine, or other suitable material, when waxed and forming a continuous flexible taper, substantially as set forth.

BENJAMIN F. WOODSIDE.

Witnesses:
 DANIEL BREED,
 EDM. F. BROWN.